United States Patent [19]
O'Brien

[11] Patent Number: 5,628,019
[45] Date of Patent: May 6, 1997

[54] SYSTEM AND METHOD FOR CONTROLLING A PERIPHERAL BUS CLOCK SIGNAL DURING A REDUCED POWER MODE

[75] Inventor: Rita M. O'Brien, Austin, Tex.

[73] Assignee: Advanced Micro Devices, Inc., Sunnyvale, Calif.

[21] Appl. No.: 656,840

[22] Filed: Jun. 4, 1996

Related U.S. Application Data

[63] Continuation of Ser. No. 234,819, Apr. 28, 1994, abandoned.

[51] Int. Cl.⁶ .................................................. G06F 13/00
[52] U.S. Cl. ...................... 395/750; 395/556; 395/326; 364/273.1; 364/270.3; 364/240.3; 364/230.4; 364/242.6; 364/DIG. 2
[58] Field of Search ....................................... 395/550, 750

[56] References Cited

U.S. PATENT DOCUMENTS

| | | | |
|---|---|---|---|
| 4,381,552 | 4/1983 | Nocilini et al. | |
| 4,590,553 | 5/1986 | Noda | 364/200 |
| 4,748,559 | 5/1988 | Smith et al. | 364/200 |
| 4,841,440 | 6/1989 | Yonezu et al. | |
| 5,021,950 | 6/1991 | Nishikawa et al. | 364/200 |
| 5,150,467 | 9/1992 | Hayes et al. | 395/325 |
| 5,167,024 | 11/1992 | Smith et al. | 395/375 |
| 5,263,172 | 11/1993 | Olnowich | 395/800 |
| 5,339,395 | 8/1994 | Pickett et al. | 395/325 |
| 5,341,508 | 8/1994 | Keeley et al. | 395/800 |
| 5,361,392 | 11/1994 | Fourcroy et al. | 395/800 |
| 5,392,422 | 2/1995 | Hoel et al. | 395/550 |
| 5,392,437 | 2/1995 | Matter et al. | 395/750 |
| 5,396,602 | 3/1995 | Amini et al. | 395/325 |

OTHER PUBLICATIONS

Andrews, Warren, "PCI Promises Solution To Local–Bus Bottleneck", (Aug. 1992), vol. 31, No. 8, pp. 36–40.
Slater, Superset Provides Transparent Power Management, Hardware Features Supported by Architectural Extensions, Microprocessor Report Oct. 31, 1990 V4 N19 p. 12(3).
Dubois et al, ASIC Design Considerations for Power Management in Laptop Computers, Euro ASIC' 91 pp. 348–351.
Gwennap, Intel Adds Low–Power Features to Every i486; More Choices for Notebook Designers, Microprocessor Report Jun. 21, 1993 V7 N8 p. 1(4).

*Primary Examiner*—Kevin A. Kriess
*Assistant Examiner*—Lucien Toplu
*Attorney, Agent, or Firm*—B. Noel Kivlin; Conley, Rose & Tayon

[57] ABSTRACT

A system and method for controlling a peripheral bus clock signal through a slave device are provided that accommodate a power conservation scheme in which a peripheral bus clock signal may be stopped, for example, by a power management unit or other central resource. Upon system reset, the BIOS boot code reads a configuration register MAXLAT within each alternate bus master. The contents of the configuration register are indicative of how often the particular master may require access to the peripheral bus. Upon reading the MAXLAT field of each master, the system sets a timer in accordance with the MAXLAT value corresponding to the master which requires the most frequent access to the peripheral bus. If the master requiring the peripheral bus most frequently specifies a maximum latency time of, for example, 2 microseconds, the system sets the timer to cycle (or trigger) every one microsecond (i.e., one-half of the specified maximum latency time). Thereafter, if a decision is made by the power management unit to stop the peripheral bus clock, the timer begins cycling. Upon lapse of each microsecond, the timer causes the clock generator to provide at least one clock edge (i.e., a clock one-shot or multi-shot). This ensures that any bus master coupled to the peripheral bus can generate a synchronous bus request signal to obtain mastership of the peripheral bus even though that master is incapable of generating a clock request signal.

7 Claims, 12 Drawing Sheets

SYSTEM AND METHOD FOR CONTROLLING A PERIPHERAL BUS CLOCK SIGNAL DURING A REDUCED POWER MODE

This is a continuation of application Ser. No. 234819 filed Apr. 28, 1994 now abandoned.

BACKGROUND OF THE INVENTION

1. Field of the Invention

This invention relates to power management within computer systems and more particularly to a system and method for controlling a peripheral bus clock signal.

2. Description of the Relevant Art

An on-going developmental goal of manufacturers has been to reduce the power consumption of computer systems. Reducing power consumption typically reduces heat generation of the system, thereby increasing reliability and decreasing cost. In addition, power reduction has been particularly important in maximizing the operating life of battery-powered portable computer systems.

Various techniques have been devised for reducing the power consumption of computer systems. These techniques include increasing the integration of circuitry and incorporation of improved circuitry and power management units (PMU's). One specific power reduction technique involves the capability of stopping clock signals that drive inactive circuit portions. A system employing such a technique typically includes a power management unit that detects or predicts inactive circuit portions and accordingly stops the clock signals associated with the inactive circuit portions. By turning off "unused" clock signals that drive inactive circuit portions, overall power consumption of the system is decreased. A similar technique involves the capability of reducing the frequency of clock signals that drive circuit portions during operating modes which are not time critical.

Although the capability of stopping "unused" clock signals has been generally successful in reducing power consumption, the technique has generally not been applied to clock signals that drive peripheral buses having alternate bus masters connected thereto. The reason for this limitation is best understood from the following example.

Figure 1:
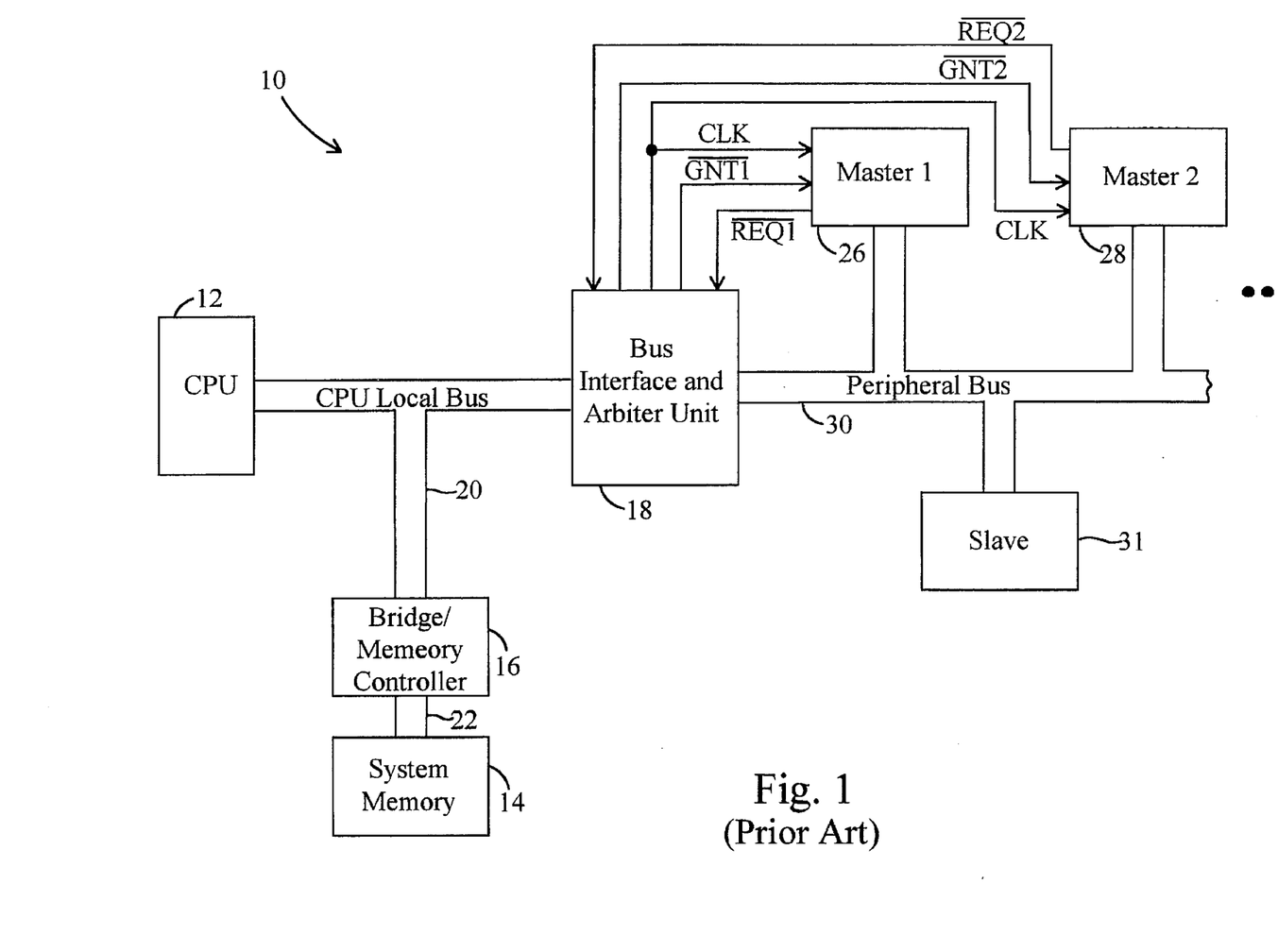
FIG. 1 is a block diagram that illustrates a computersystem including a peripheral bus and a plurality of alternate bus masters coupled thereto.

FIG. 1 is a block diagram that illustrates a computer system 10 including a microprocessor (CPU) 12, a system memory 14, a bridge/memory controller 16, and a bus interface and arbiter unit 18. A CPU local bus 20 couples the microprocessor 12 to bridge/memory controller 16 and bus interface and arbiter unit 18. A system memory bus 22 couples system memory 14 to bridge/memory controller 16. An alternate bus master 26 labeled "Master1" and a second alternate bus master 28 labeled "Master2" are coupled to the bus interface and arbiter unit 18 through a peripheral bus 30. A slave device 31 is similarly coupled to bus interface and arbiter unit 18 through peripheral bus 30.

When alternate bus master 26 requires mastership of peripheral bus 30, a request signal labeled REQ1 is asserted by the alternate bus master 26 and is detected by bus interface and arbiter unit 18. If mastership of the bus is granted in accordance with the internal arbitration logic, the bus interface and arbiter unit 18 asserts a grant signal labeled GNT1 and, accordingly, alternate bus master 26 attains mastership of peripheral bus 30 and may execute the desired cycle.

In the system of FIG. 1, the request signal REQx (i.e., REQ1 or REQ2) must be asserted by the associated alternate bus master synchronous to the peripheral bus clock signal CLK. This requirement is specified by several prevalently utilized peripheral bus standards, such as the PCI bus standard. As a result of the requirement, systems employing such peripheral bus standards are designed such that the peripheral bus clock signal CLK is always turned on, thereby allowing an alternate bus master to generate a synchronous request signal. In such systems, however, power is wasted when the peripheral bus is idle.

An additional hindrance to the employment of clock-stopping (or clock-slowing) power reduction techniques for peripheral buses arises since slave devices may require a clock signal beyond the end of a peripheral bus cycle. For example, additional clock cycles may be required at the completion of a peripheral bus cycle for slave device 31 to empty an internal FIFO. If the clock signal were stopped during such a situation, the performance of the system as well as the integrity of data may be adversely affected.

Still another problem associated with stopping or slowing a peripheral bus clock signal for power management purposes is that if the peripheral device is incapable of restarting the peripheral bus clock signal or does not receive a clock edge within a given time, the external bus master may be stalled or may lose data. As a result, the performance of the system may be degraded or the integrity of data may be adversely affected. Since data integrity is crucial within any computer system and since conventional peripheral bus masters are typically incapable of controlling an associated peripheral bus clock signal, such conventional bus master devices may not be compatible with a computer system wherein a peripheral clock signal is stopped or slowed for power management. Consequently, the backwards compatibility of such a computer system with conventional peripheral devices may be limited.

SUMMARY OF THE INVENTION

The problems outlined above are in large part solved by a system and method for controlling a peripheral bus clock signal according to the present invention. The system accommodates a power conservation technique wherein a peripheral bus clock signal may be stopped (or slowed) in response to, for example, a power management unit. If an alternate bus master requires mastership of the peripheral bus when the peripheral bus clock signal is stopped, the alternate bus master may be configured to assert a clock request signal for re-starting the peripheral bus clock. The clock request signal is broadcasted on the peripheral bus and is accordingly received by a clock control circuit. The clock control circuit responsively causes the re-starting of the peripheral bus clock signal. Subsequently, the alternate bus master can generate a bus request signal that is synchronous to the peripheral bus clock signal to thereby obtain a grant signal from a bus arbiter unit.

The system may further be configured to achieve backwards compatibility with conventional alternate bus masters that are incapable of internally generating a bus request signal. For such an embodiment, upon system reset, the BIOS boot code reads a configuration register within each alternate bus master. For PCI based systems, this configuration register may be the so-called MAXLAT register (or field). The contents of the configuration register are indicative of how often the particular master may require access to the peripheral bus. Upon reading the MAXLAT field of each master, the system sets a clock control timer in accordance with the MAXLAT value corresponding to the master which requires the most frequent access to the peripheral bus. If the master requiring the peripheral bus most frequently specifies a maximum latency time of, for example, 2 microseconds, the system sets the clock control timer to cycle (or trigger) every one microsecond (i.e., one-half of the specified maximum latency time). Thereafter, if a decision is made by the power management unit to stop the peripheral bus clock, the clock control timer begins cycling. Upon lapse of each microsecond, the clock control timer causes the clock generator to provide at least one clock edge (i.e., a one-shot or a multi-shot). This ensures that any bus master coupled to the peripheral bus can generate a synchronous bus request signal to obtain mastership of the peripheral bus even though that master is incapable of generating a clock request signal. The system further accomodates optimization of power management by stopping the clock signal for as long as possible between providing each periodic clock edge. If the power management unit alternatively causes the peripheral bus clock signal to be slowed during a power conserving mode, the values read from the MAXLAT fields of each master may be used to determine the minimum frequency at which the clock signal may be slowed. That is, the clock generator would be set to generate the peripheral bus clock signal at a period of not larger than half the maximum latency value specified within the MAXLAT field of the master requiring the peripheral bus most frequently. As a result of a system according to the present invention, the peripheral bus clock signal can be stopped or slowed for power management while still accommodating alternate bus masters that must assert a synchronous bus request signal to obtain mastership of the peripheral bus.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
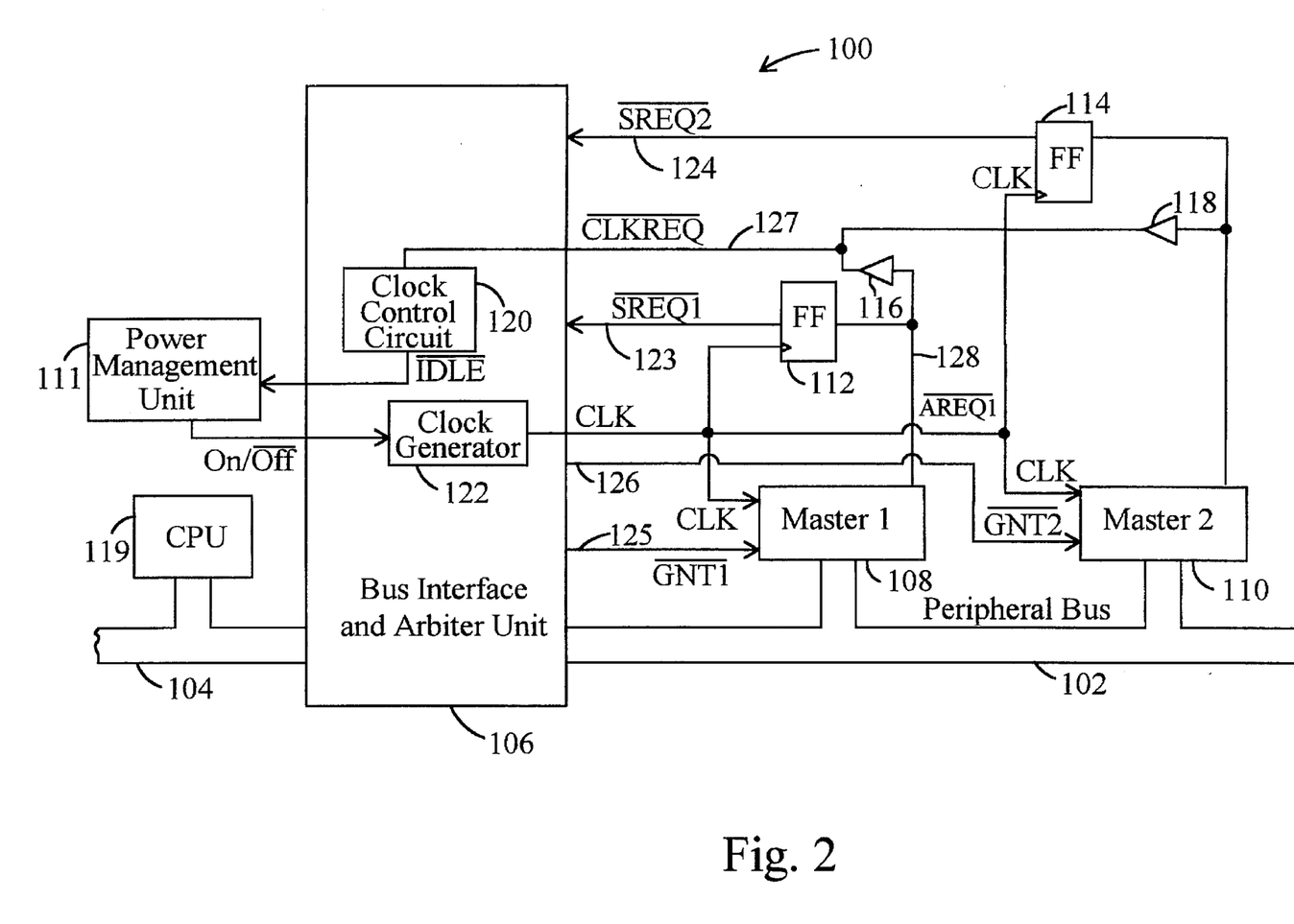
FIG. 2 is a block diagram that illustrates a portion of a computer system including a clock control circuit for re-starting a peripheral bus clock signal.

Referring now to FIG. 2, a block diagram is shown of a portion of a computer system 100 in which a peripheral bus 102 is coupled to a CPU local bus 104 through a bus interface and arbiter unit 106. An alternate bus master 108 labeled "Master1" and a second alternate bus master 110 labeled "Master2" are coupled to peripheral bus 102, and a microprocessor (CPU) 119 is coupled to CPU local bus 104. A power management unit 111, flip-flops 112 and 114, and signal drivers 116 and 118 are further coupled to bus interface and arbiter unit 106.

The alternate bus masters 108 and. 110 could be embodied by a variety of specific peripheral bus devices. For example, alternate bus master 108 could be embodied by a local area network (LAN) device that connects other computer systems to peripheral bus 102. Similarly, alternate bus master 110 could be embodied by an expansion bus interface that connects peripheral bus 102 to other peripheral buses.

Peripheral bus 102 has a predetermined bit width and may be connected to a variety of other peripheral devices such as CD-ROM devices. In one embodiment, peripheral bus 102 is implemented using the PCI standard bus configuration, although other peripheral bus standard configurations could be alternatively employed. The PCI standard bus configuration is described in the publication *PCI Local Bus Specification*, Revision 2, Apr. 30, 1993, PCI Special Interest Group. This document is incorporated herein by reference in its entirety.

Microprocessor 119 is a data processing unit that implements a predetermined instruction set. Exemplary processing units include the model 80386 and model 80486 microprocessors. It is noted that the CPU local bus 104 may couple microprocessor 119 to a variety of other components, such as a cache memory and a memory controller.

The bus interface and arbiter unit 106 includes conventional circuitry that controls well known interfacing functions such as orchestrating and transferring control, data, and address signals between microprocessor 119 and devices coupled to peripheral bus 102. The bus interface and arbiter unit 106 further arbitrates and prioritizes devices that contend for the mastership of peripheral bus 102. Similar to the example described previously in conjunction with FIG. 1, arbitration logic within the bus interface and arbiter unit 106 is configured to detect a synchronous request signal asserted by an alternate bus master and to generate an associated grant signal when mastership of the peripheral bus 102 can be attained. The bus interface and arbiter unit 106 receives synchronous request signals SREQ1 and SREQ2 at lines 123 and 124, respectively, and generates grant signals GNT1 and GNT2 at lines 125 and. 126, respectively. It will be appreciated by those skilled in the art that these portions of the bus interface and arbiter unit 106 could be implemented using a variety of specific circuit configurations, and that exemplary circuit configurations are described in a host of publications of the known prior art.

The bus interface and arbiter unit 106 additionally includes a clock control circuit 120 and a clock generator 122. The clock generator 122 generates a peripheral bus clock signal labeled "CLK" for driving peripheral devices such as alternate bus master 108 and alternate bus master 110. As will be explained in greater detail below, the clock control circuit 120 controls the re-starting of clock generator 122 to accommodate alternate bus masters after power management unit 111 has stopped the peripheral bus clock signal CLK.

The operation of computer system 100 will be described next. For this discussion, it is assumed initially that power management unit 111 has caused clock generator 122 to turn off and thus that the peripheral bus clock signal CLK is stopped. Power management unit 111 may be configured to turn off clock generator 122 following, for example, the completion of a peripheral bus cycle executed by microprocessor 119 when no bus request signals are currently pending within bus interface and arbiter unit 106.

If one of the alternate bus masters 108 or 110 requires mastership of peripheral bus 102, a corresponding asynchronous bus request signal is asserted by that device. For example, if alternate bus master 108 requires mastership of peripheral bus 102, asynchronous request signal AREQ1 is asserted low at line 128. As with the example of FIG. 1, the request signal received by bus interface and arbiter unit 106 at line 123 must be synchronous to the peripheral bus clock signal CLK. However, at this point, the clock generator 122 is turned off. Therefore, to provide a synchronous request signal, the asynchronous request signal AREQ1 is buffered through signal driver 116 which causes an asynchronous clock request signal CLKREQ at line 127 to be asserted low. When clock control circuit 120 detects the low assertion of the clock request signal CLKREQ, a signal IDLE is deasserted high by clock control circuit 120 which causes the power management unit 111 to turn on clock generator 122 and thus re-start the peripheral bus clock signal CLK (i.e., by driving signal ON/OFF high).

Upon the rising edge of the first peripheral clock signal CLK, the logical low signal at the line 128 (i.e., signal AREQ1) is latched into flip-flop 112 and is driven at the output of flip-flop 112. Accordingly, a synchronous request signal SREQ1 dictated by the output state of flip-flop 112 goes low. It is noted that the low transition of signal SREQ1 occurs synchronously with the clock signal CLK.

When the bus interface and arbiter unit 106 detects the low assertion of the synchronous request signal SREQ1, the bus interface and arbiter unit 106 generates the grant signal GNT1 according to its internal arbitration logic and consequently grants mastership of the peripheral bus 102 to the alternate bus master 108.

In the preferred embodiment, the alternate bus master 108 asserts the asynchronous request signal AREQ1 for a total of two clock cycles when mastership of peripheral bus 102 is desired. When the clock control circuit 120 detects the resulting low signal at line 127, the clock control circuit 120 takes over the drive and maintains a logical low signal at line 127, even though the asynchronous request signal AREQ1 has been deasserted by alternate bus master 108 following the two clock cycles. After the IDLE signal is deasserted high and clock generator 122 has been turned on by power management unit 111, the peripheral bus clock signal CLK cannot be stopped until the system microprocessor 119 regains mastership of peripheral bus 102, at which point the power management unit 111 may determine that the clock generator 122 can be stopped. For example, as stated previously, power management unit 111 may be configured to stop the peripheral bus clock signal CLK upon the completion of a peripheral bus cycle executed by microprocessor 119 if no bus request signals are currently pending within bus interface and arbiter unit 106. When the power management unit 111 determines that the peripheral bus clock signal CLK can be stopped according to such a predetermined condition, the clock control circuit 120 drives the clock request signal CLKREQ high for one clock cycle. Following this, the clock control circuit 120 releases the drive of the clock request signal CLKREQ and tri-states line 126. The power management unit 111 then turns off clock generator 122 by driving signal ON/OFF low, thereby causing the peripheral bus clock signal CLK to stop.

Figure 2A:
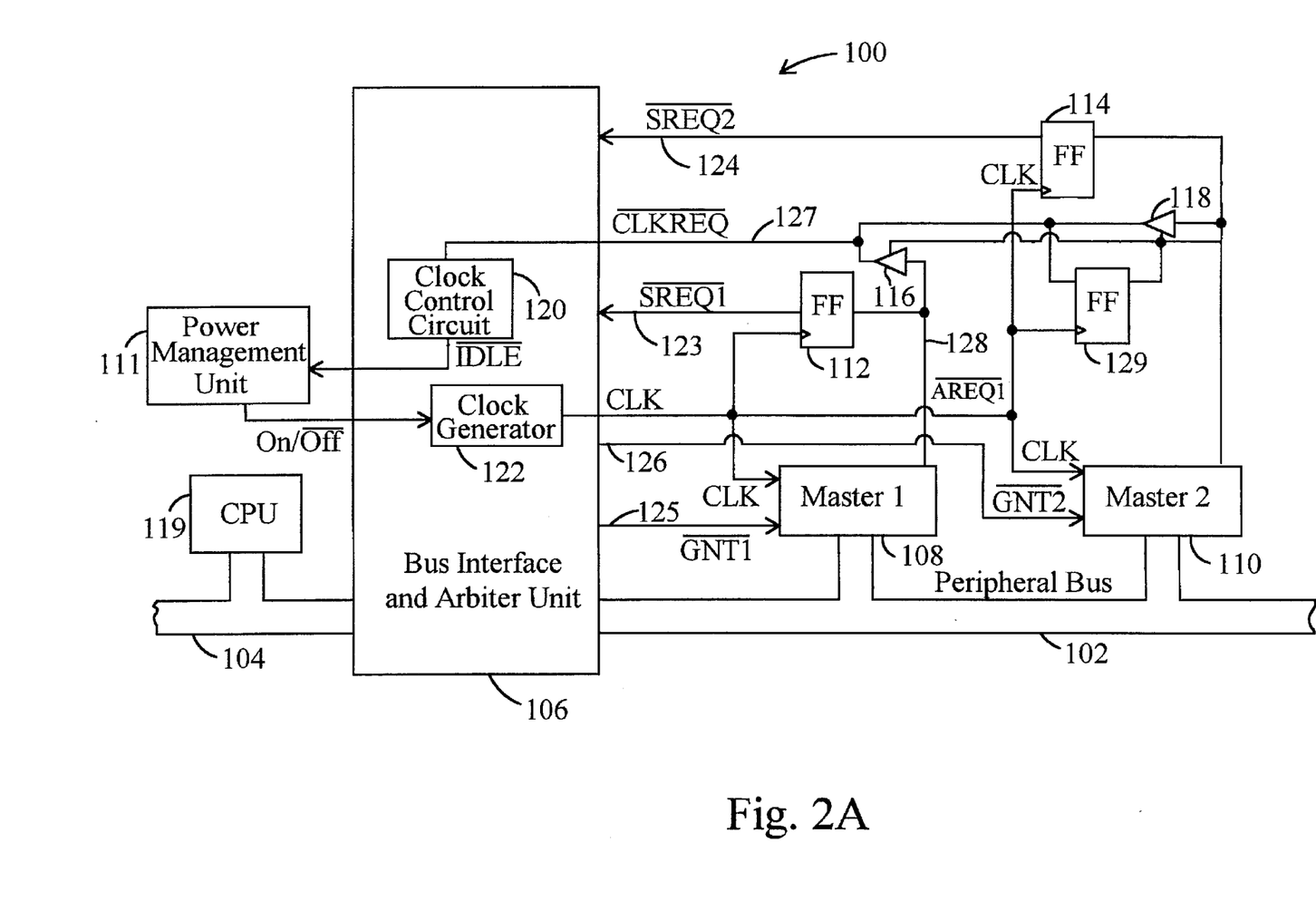
FIG. 2A is a block diagram that illustrates a portion of a computer system including a flip-flop for enabling a pair of signal drivers.

It is noted that in the preferred embodiment, signal drivers 116 and 118 are enabled only if line 127 was sampled high during the rising edge of the last peripheral bus clock signal CLK. This prevents possible signal contention at line 127 if an asynchronous request signal AREQx (i.e., AREQ1 or AREQ2) is asserted low at the same time the clock control circuit 120 drives line 127 high. An implementation of this feature is illustrated in FIG. 2A in which a flip-flop 129 is used to sample line 127 during each cycle of the peripheral clock signal CLK, and to enable signal drivers 116 and 118 only if line 127 was sampled high.

Referring back to FIG. 2, if the asynchronous request signals AREQ1 and AREQ2 are asserted simultaneously or concurrently, indicating that both alternate bus masters 108 and 110 desire mastership of peripheral bus 102, the clock request signal CLKREQ will again be driven low, thereby causing the peripheral bus clock signal CLK to restart. The synchronous request signals SREQ1 and SREQ2 are accordingly provided at the outputs of flip-flops 112 and 114, respectively, and are received at bus interface and arbiter unit 106. One of the grant signals GNT1 or GNT2 will thereafter be asserted in accordance with the predetermined priority established by the internal arbitration logic, and the other grant signal will be delayed until the "higher-priority" alternate bus master has completed its corresponding bus cycle. Thereafter, the bus interface and arbiter 106 unit asserts the other grant signal to allow the "lower priority" alternate bus master to execute its corresponding bus cycle.

Figure 3:
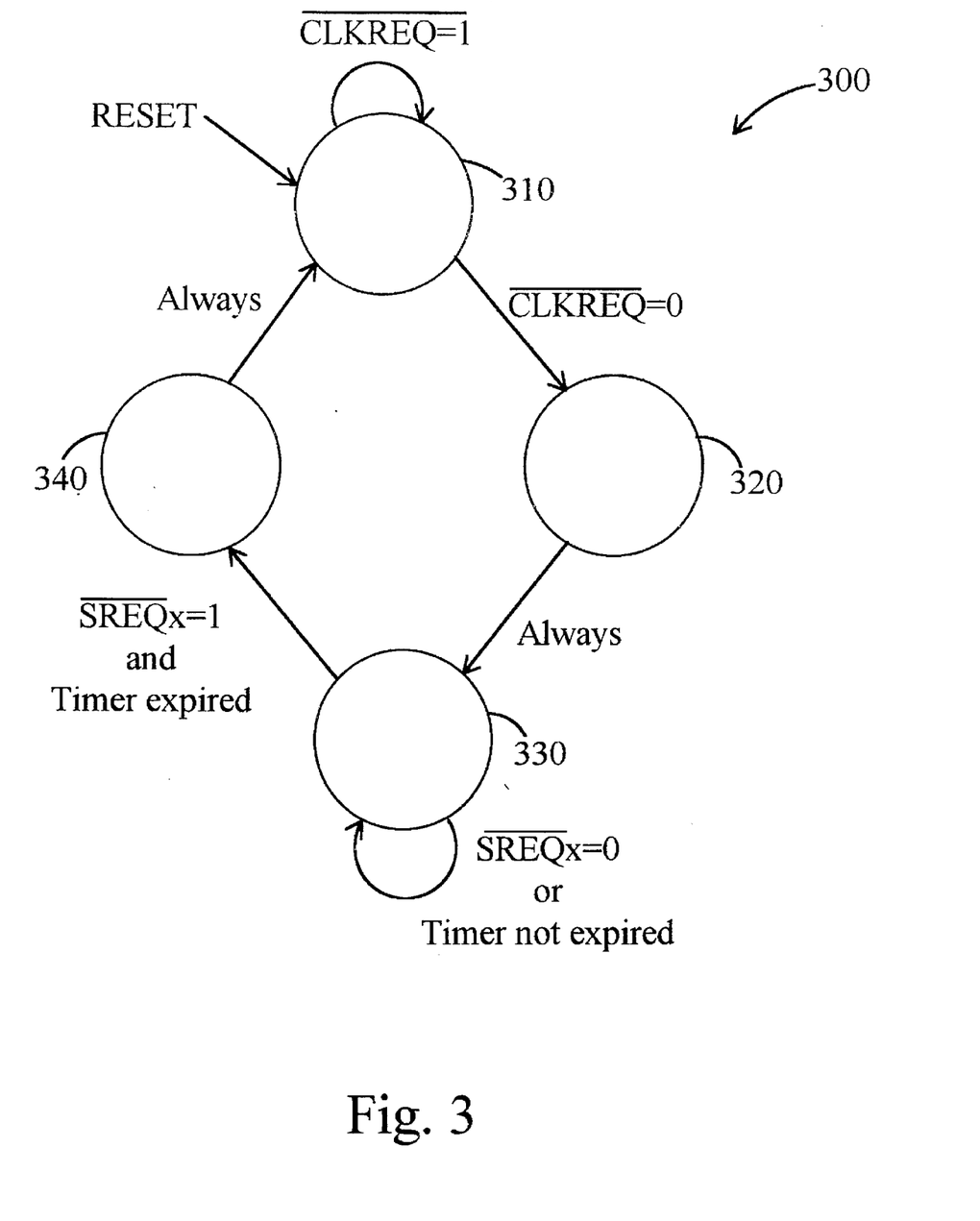
FIG. 3 is a diagram of an algorithmic state machine embodied within the clock control circuit of FIG. 2.

The internal logic of the clock control circuit 120 is next considered. FIG. 3 is a diagram of an algorithmic state machine 300 embodied within the clock control circuit 120. State machine 300 includes four states 310, 320, 330 and 340. When the peripheral bus clock signal CLK is stopped, state machine 300 is in an idle state 310. State machine 300 remains in state 310 for as long as the clock request signal ClKREQ is high.

When the clock request signal CLKREQ goes low, state machine 300 enters a state 320. This transition occurs when one of the asynchronous request signals AREQx has been asserted by one of the alternate bus masters. During state 320, the clock control circuit 120 drives line 127 low and deasserts signal IDLE high. Power management unit 111 detects the deassertion of signal IDLE and consequently turns on clock generator 122 to re-start the peripheral bus clock signal CLK.

State machine 300 next enters state 330 during which the signal IDLE continues to be deasserted high. State machine 300 remains in state 330 for the entire time that a synchronous request signal SREQx is low. If all synchronous request signals are high, state machine 300 remains in state 330 for a predetermined time in accordance with a delay time established by an internal timer. This delay time is provided to ensure that ample time is provided after re-starting the clock signal CLK for the corresponding synchronous request signal SREQx to be driven low (i.e., by flip-flop 112 or 114). In one embodiment, the internal timer of state 330 is defined to ensure that at least four clock cycles have transpired before state machine 300 can exit from state 330.

When the synchronous request signals SREQx are high and the timer has expired, state machine 300 enters state 340. During state 340, the clock request signal CLKREQ is driven high by the clock control circuit 120 for one clock cycle. The IDLE signal is further asserted low.

The state machine 300 next reverts back to idle state 310 and clock control circuit 120 tri-states the clock request line 127. The power management unit 111 may subsequently turn off clock generator 122 after the system microprocessor 119 has regained mastership of peripheral bus 102, or according to any other desired power management scheme. Thereafter, the peripheral bus clock signal CLK may again be re-started by another alternate bus master in the manner described above by asserting the clock request signal low.

Referring back to FIG. 2, it is noted that flip-flops 112 and 114 as well as signal drivers 116 and 118 may be incorporated as integral parts of the alternate bus masters 108 and 110. It is further noted that although signal lines 123–127 are shown separately from peripheral bus 102 for simplicity, signal lines 123–127 may be predefined control lines of the peripheral bus 102.

Figure 4:
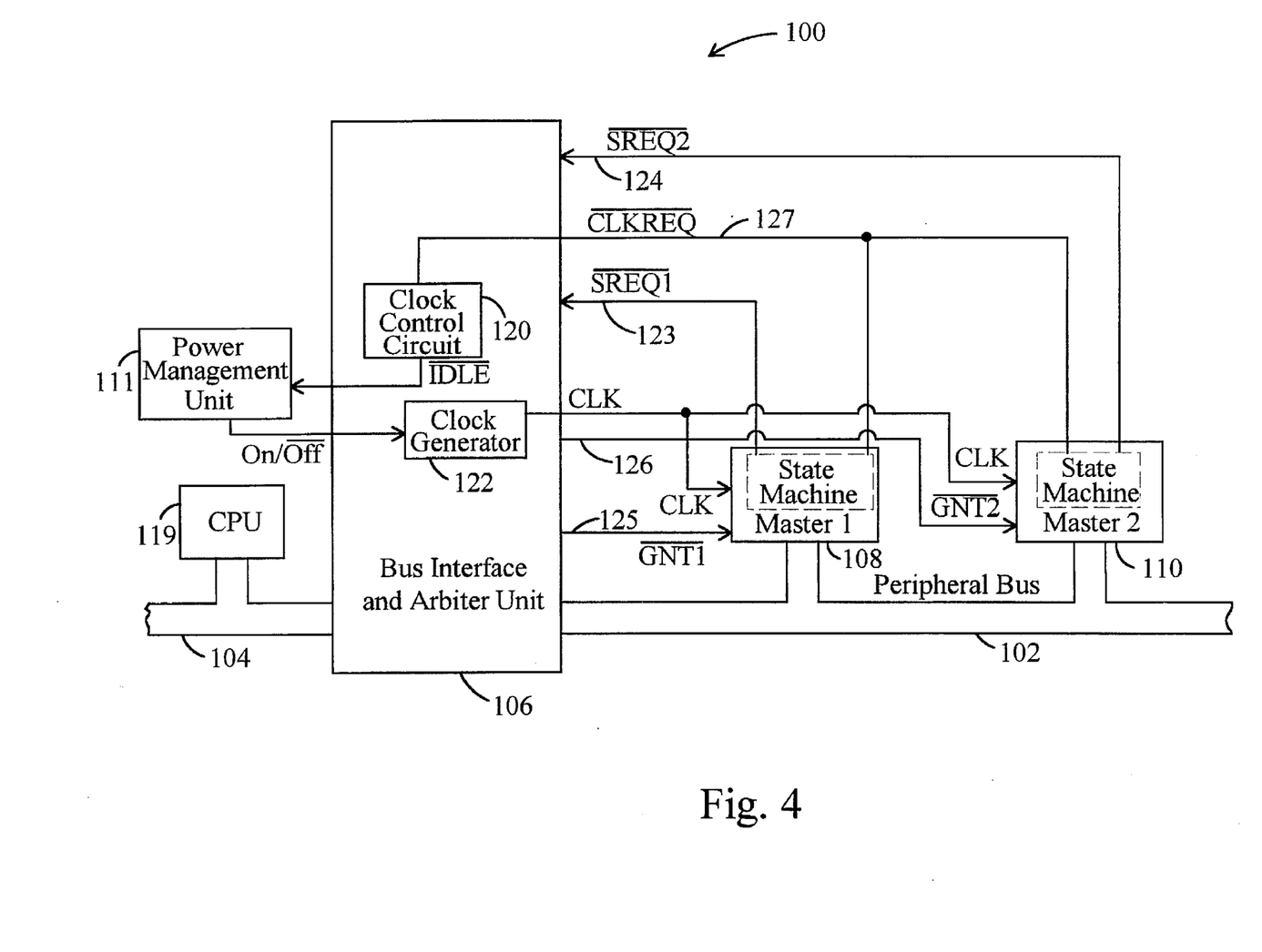
FIG. 4 is a block diagram of a portion of a computer system including alternate bus masters having internal state machines for requesting the peripheral bus clock signal and generating synchronus bus request signals.
Figure 5:
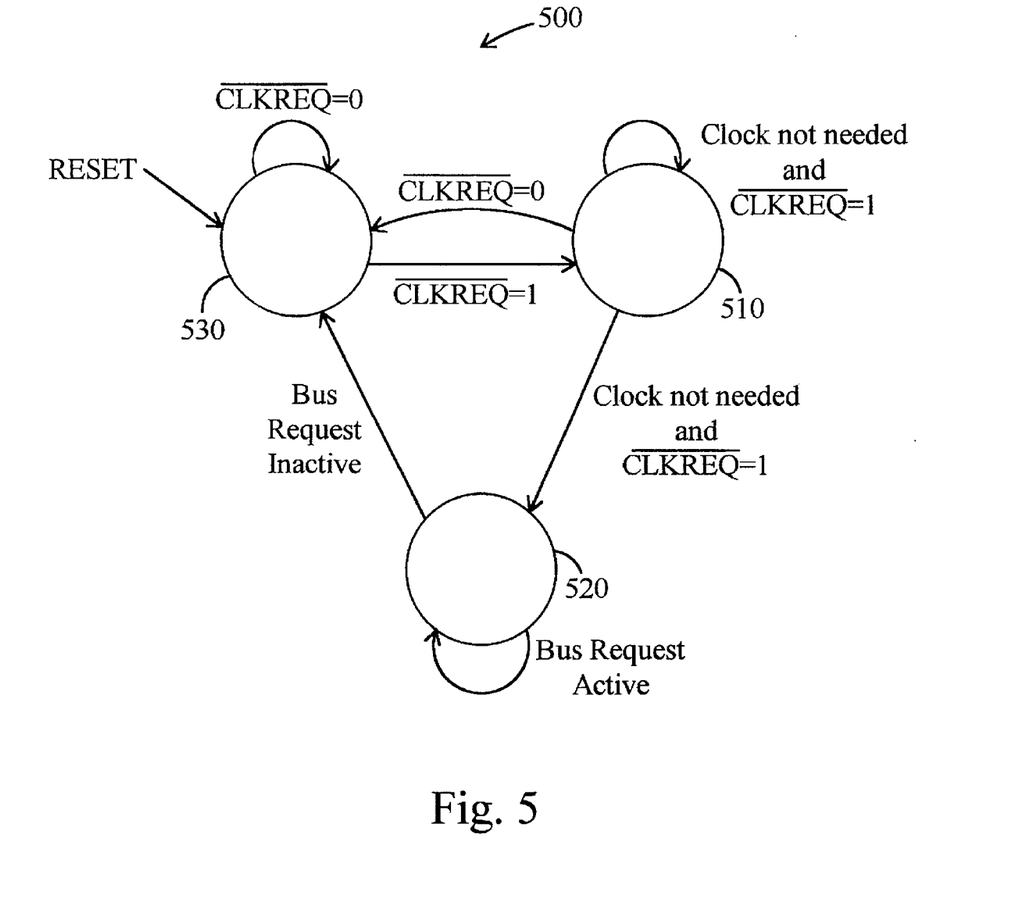
FIG. 5 is a diagram of an algorithmic state machine embodied within alternate bus master.

In another embodiment as illustrated in FIG. 4, a state machine is incorporated within each alternate bus master to generate the clock request signal CLKREQ and the synchronous request signal SREQx. Circuit portions that correspond to those of FIG. 2 are numbered identically. FIG. 5 is a diagram of an algorithmic state machine 500 incorporated within each alternate bus master of such an embodiment. State machine 500 includes states 510, 520 and 530.

Referring to FIG. 5 with reference to FIGS. 3 and 4, following reset, when the clock request signal goes high, state machine 500 transitions to state 510. At this point the power management unit 111 may signal the clock generator 122 to stop the clock. If the master peripheral has no need for the clock, state machine 500 remains in state 510. If system events cause the clock request signal to go low, state machine 500 reverts to state 530. If while in state 510, the master needs the clock, the state machine 500 transitions to state 520, causing the clock request signal CLKREQ to be driven low. The clock control circuit 120 then signals the clock generator 122 to restart the clock if it was stopped. The master may now assert its synchronous bus request signal SREQx to acquire the bus and perform its transaction. As long as the master maintains its bus request, the state machine remains in state 520. When the master deasserts its bus request, the state machine transitions to state 530 causing the clock request signal CLKREQ to tri-state.

As a result of the systems of FIGS. 2 and 4, a peripheral bus clock signal may be stopped for power management while still accommodating alternate bus masters that must assert a synchronous bus signal to obtain mastership of the peripheral bus. Power consumption of the computer systems may thereby be reduced while maintaining broad. compatibility.

Figure 6:
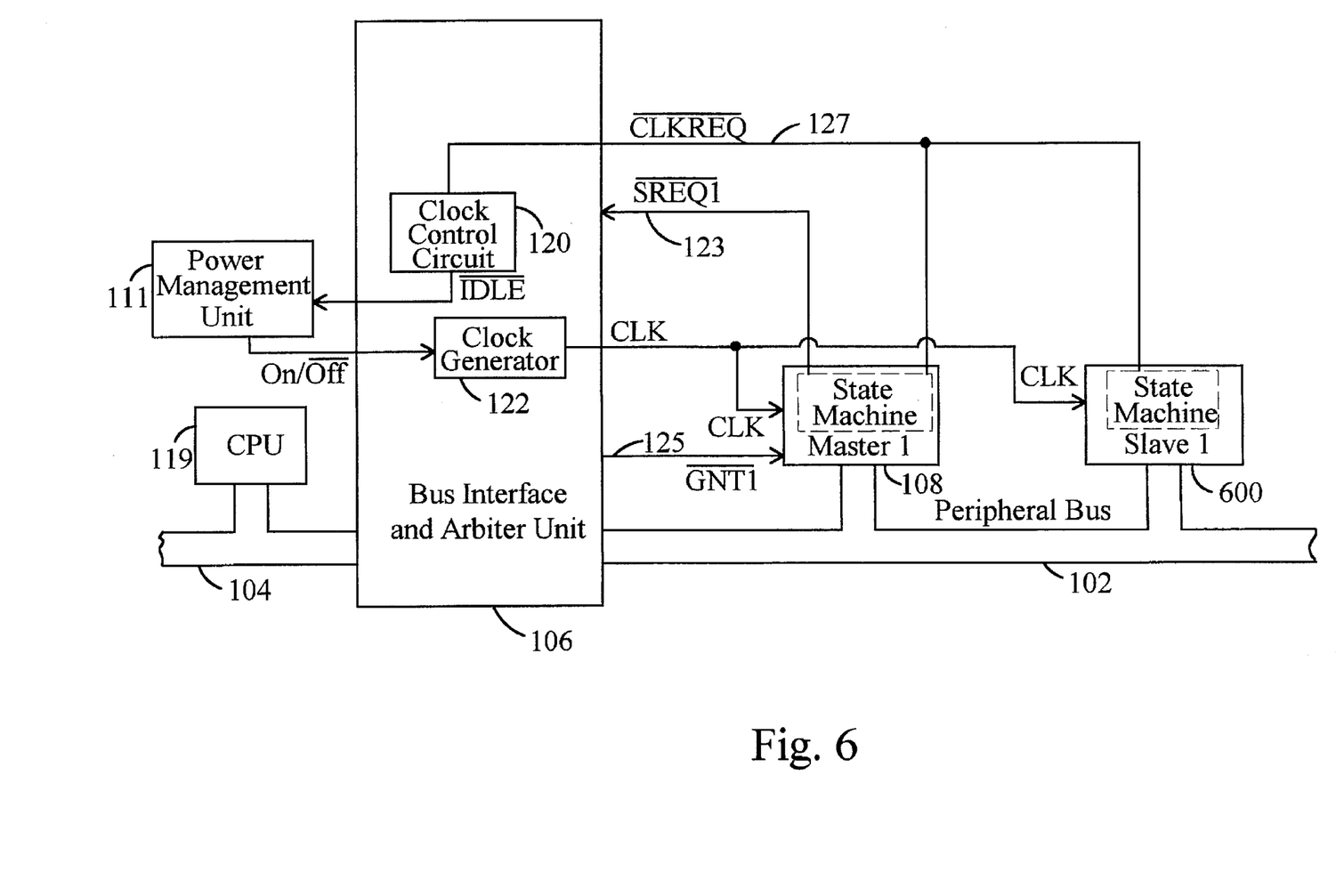
FIG. 6 is a block diagram that illustrates a computer system including a slave device capable of asserting a clock request signal.

Turning next to FIG. 6, a portion of a similar computer system is shown in which a slave device 600 is coupled to peripheral bus 102. Circuit blocks that correspond to those of FIG. 4 are numbered identically.

Slave device 600 is coupled to receive the peripheral clock signal CLK and is coupled to line 127. As will be explained in greater detail below, the embodiment of FIG. 6 allows slave device 600 to prevent the peripheral bus clock signal from being stopped if the peripheral bus clock signal is required by the slave following a peripheral bus cycle. For example, slave device 600 may require the peripheral bus clock signal after the completion of a peripheral bus transfer cycle to empty an internal FIFO buffer.

During operation of the embodiment of FIG. 6, slave device 600 monitors the clock request signal CLKREQ at line 127. If slave device 600 detects a high assertion of the clock request signal CLKREQ and if the peripheral bus clock signal CLK is still required by the slave device, slave device 600 drives line 127 back low on the next clock cycle to prevent the peripheral bus clock signal CLK from being stopped.

Figure 7:
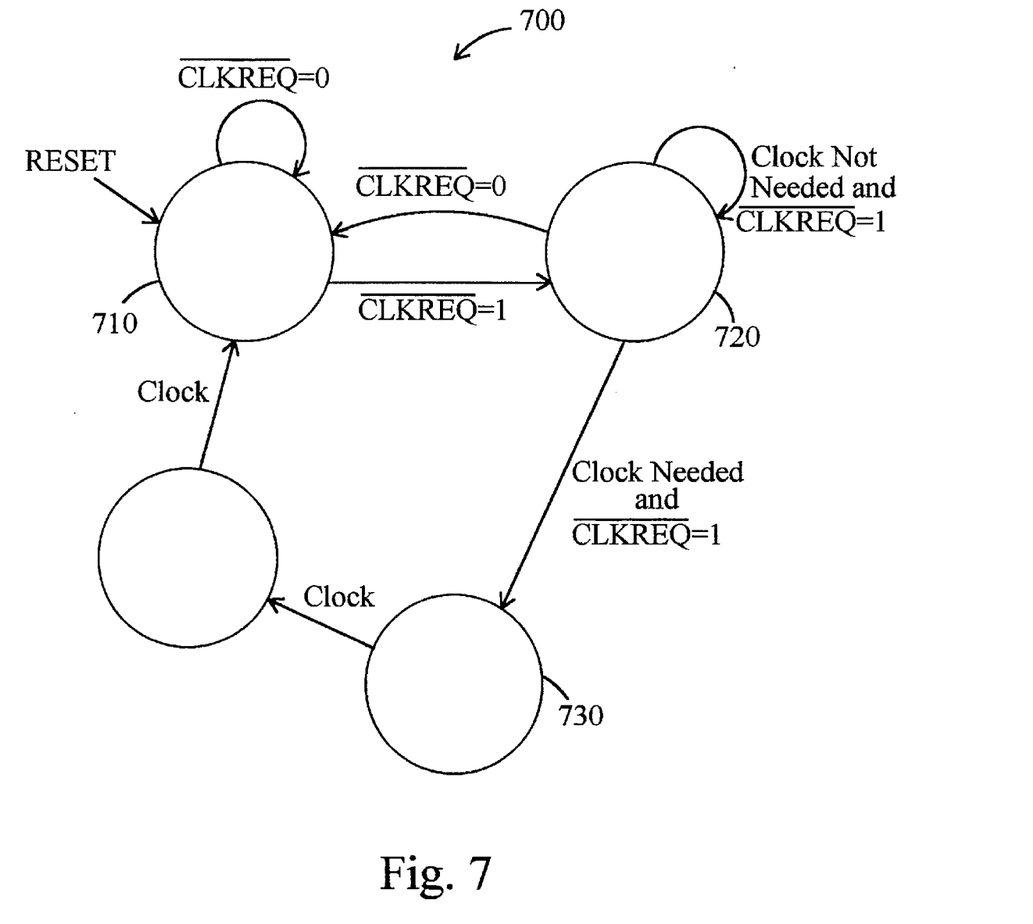
FIG. 7 is a diagram of an algorithmic state machine embodied within the slave device.

FIG. 7 is a diagram of an algorithmic state machine 700 embodied within slave device 600. Upon reset of the system, state machine 700 enters state 710 during which line 127 is tri-stated by slave 600. State machine 700 remains in state 710 for as long as the clock request signal CLKREQ at line 127 is low.

When the clock request signal CLKREQ at line 127 goes high, state machine 700 enters state 720. During state 720, line 127 continues to be tri-stated by slave device 600. State machine 700 remains in state 720 for as long as the clock request signal CLKREQ remains high and while there is no need for the peripheral bus clock signal CLK.

If the clock request signal CLKREQ at line 127 falls back low, state machine 700 returns to state 710. If, on the other hand, the peripheral bus clock signal CLK is needed by slave 600 and the clock request signal at line 127 is high, state machine 700 enters state 730. During state 730, the clock request signal at line 127 is pulled low by slave device 600 for two clock cycles. State machine 700 then re-enters state 710 and line 127 is tri-stated by slave device 600.

Figure 8:
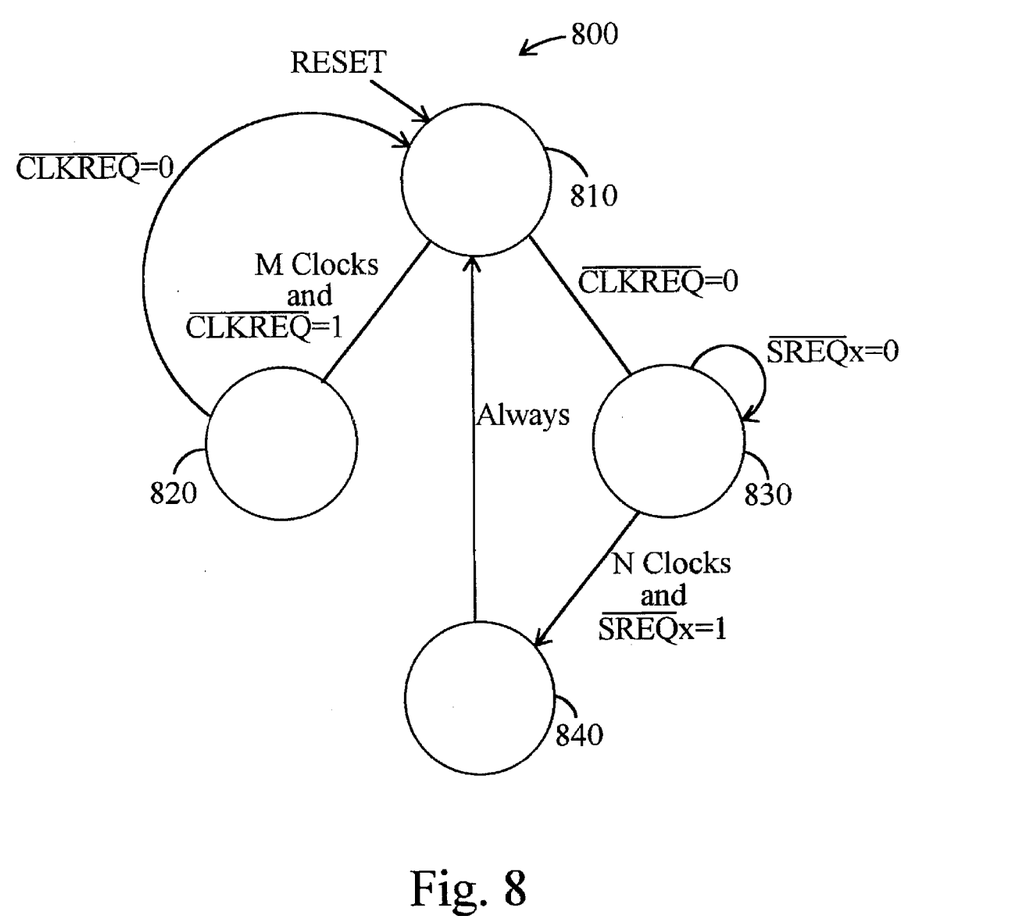
FIG. 8 is a diagram of an algorithmic state machine embodied within the clock control circuit.

FIG. 8 is a diagram of an alternative embodiment of a state machine 800 embodied within the clock control circuit 120 of FIGS. 2, 4 and 6. State machine 800 is responsive to clock request signals (i.e., CLKREQ) asserted by both master and slave devices. In this embodiment, both the re-starting and the stopping of the peripheral bus clock signal is directly controlled by clock control circuit 120. It is noted that power management unit 111 may be configured to control clock generator 122 at other times during the operation of the computer system.

Upon reset, state machine 800 enters state 810 during which the clock request signal CLKREQ at line 127 is tri-stated and is passively pulled high by the clock control circuit 120 and during which the peripheral bus clock signal CLK is on. If the clock request signal at line 127 is detected high for a predetermined number of clocks (i.e., M clock cycles), state machine 800 enters state 820.

During state 820, line 127 continues to be tri-stated and pulled high by the clock control circuit 120 and the peripheral bus clock signal CLK is stopped. It is noted that clock generator 122 is directly controlled through power management unit 111 by clock control circuit 120 to stop the peripheral bus clock signal CLK. The state machine 800 remains in state 820 until the clock request signal CLKREQ at line 127 is pulled low, for example, by alternate bus master 108. When the clock request signal CLKREQ is asserted low, state machine 800 reverts back to state 810 and the peripheral bus clock signal CLK is re-started.

On the next clock cycle, state machine 800 will enter state 830 if the clock request signal CLKREQ continues to be asserted low. During state 830, the clock control circuit 120 maintains the low drive at line 127 so the master or slave device can release the drive. If a synchronous bus request signal (i.e., SREQx) is asserted, state machine 800 remains in state 830 until the bus request signal is deasserted high. If no bus request signal SREQx is asserted low and a predetermined number of clock cycles (i.e., N clocks) have transpired, state machine 800 enters state 840. During state 840, the clock request signal CLKREQ at line 127 is asserted high for one clock cycle by clock control circuit 120. State machine 800 then reverts back to state 810.

State machine 800 will remain in state 810 until the clock request signal at line 127 is again pulled low, thereby causing state machine 800 to enter state 830, or until M clock cycles have transpired, at which state machine 800 will enter state 820 and the peripheral bus clock signal will be stopped.

From the foregoing, it is evident that if slave device 600 requires that the peripheral clock signal CLK remain on, it will detect the low assertion of the clock request signal (referred to generally as an "indicator" signal) at line 127 by the clock control circuit 120 (i.e., during state 340, FIG. 3 or state 840, FIG. 8) and will drive the clock request signal low to keep the clock running for an additional timed period as determined by state 330 for the state machine 300 (of FIG. 3) or by state 830 for the state machine 800 (of FIG. 8).

Figure 9:
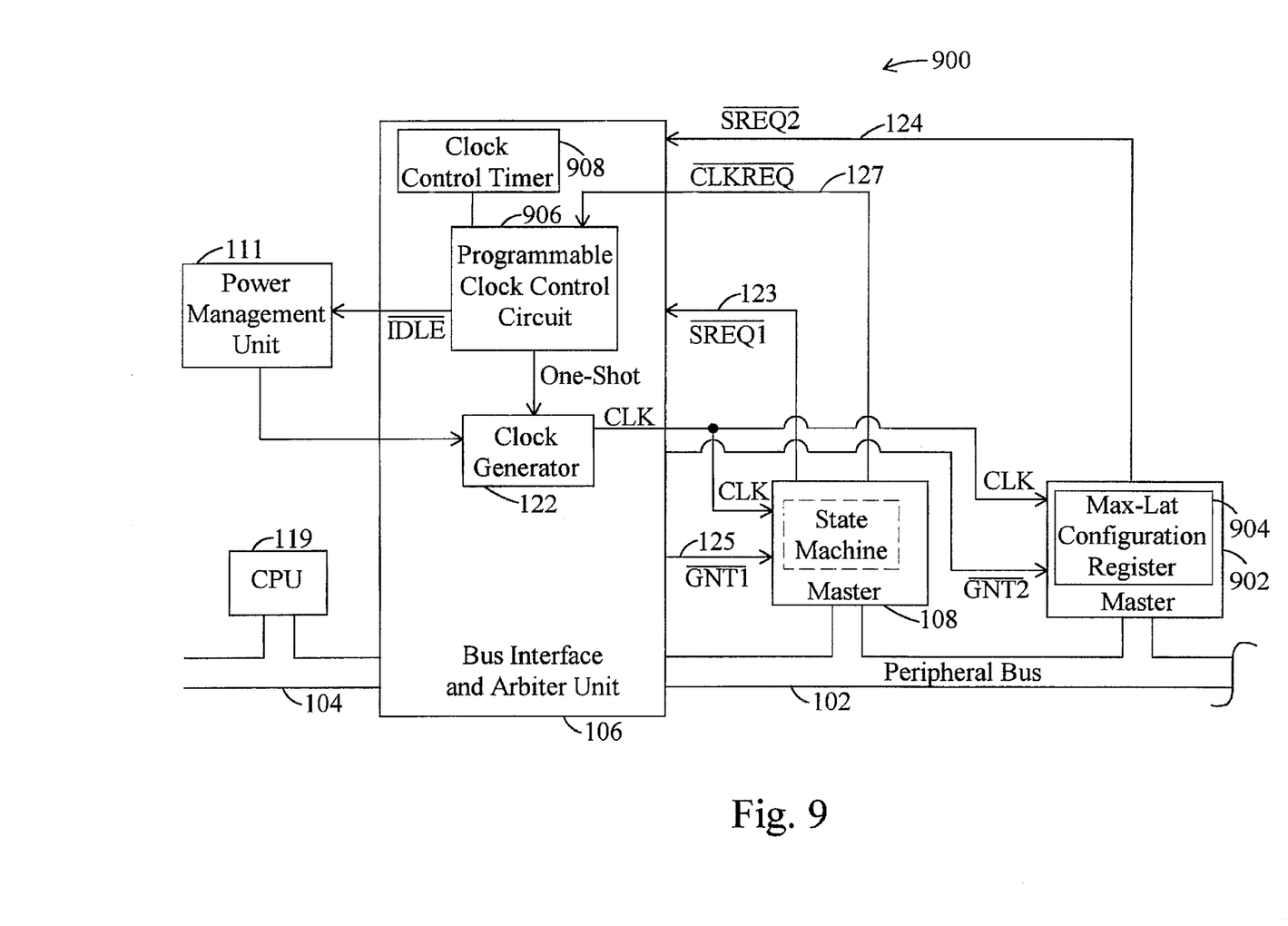
FIG. 9 is a block diagram that illustrates a computer system including a conventional master device.

Referring next to FIG. 9, a block diagram is shown of an alternative configuration of bus interface and arbiter unit 106. Circuit portions that correspond to those of FIG. 4 are numbered identically for simplicity and clarity.

The system of FIG. 9 operates in accordance with the foregoing description of FIG. 4 for bus masters that are capable of generating a clock request signal CLKREQ (i.e., such as master 108). The system also accomodates conventional bus masters which are not designed to generate a clock request signal. Master 902 represents one such conventional bus master.

To achieve backwards compatibility with conventional alternate bus masters that are incapable of internally generating a clock request signal, a programmable clock control circuit 906 is provided that controls the periodic generation of a clock signal edge during power conserving modes to ensure that a bus master (i.e., master 902)can generate a synchronous bus request signal SREQx. As will be better understood from the following description, the periodic rate at which a clock edge is generated during the power conserving mode is dependent upon a value read from internal configuration registers of the conventional bus masters.

Upon reset of computer system 900, microprocessor 119 begins execution of the BIOS boot code. During the booting procedure, a read operation is executed to read the contents of a configuration register 904 of master 902. The particular contents of this configuration register 904 will discussed in further detail below.

The BIOS code may also invoke another read request to a predetermined register location. (within master 902) which contains a status bit indicative of whether the master 902 is capable of generating a clock request signal CLKREQ (It is noted that the clock request signal may be similarly referred to as a "clock run" signal CLKRUN). For the case of master 902, the status bit will indicate to the system BIOS that it is not capable of generating the clock request signal CLKREQ. The system BIOS may subsequently initiate additional read requests to read similar status and configuration registers within any other bus masters which may be connected to peripheral bus 102, such as master 108.

The contents of the configuration register 904 of master 902 are indicative of how often the master may require access to peripheral bus 102. In the preferred embodiment wherein peripheral bus 102 is a PCI standard configuration bus, configuration register 904 may embody the so-called MAXLAT (maximum latency) register or field. As will be readily appreciated by those of skill in the art, the MAXLAT field is used with other fields to determine the required bandwidth for a particular device and therefore its priority level for bus arbitration. The MAXLAT value is also used to specify desired settings for latency time values of the particular master. As indicated within the above-cited PCI Specification, the MAXLAT field is used for specifying how often a particular device needs to gain access to the PCI bus. The value specifies a period of time in units of ¼ microseconds. A value of zero indicates the device has no major requirements for the settings of the latency timers (within the particular master).

Upon system reset, the BIOS boot code reads the designated MAXLAT configuration register within each alternate bus master connected to peripheral bus 102 and determines which bus masters can support generation of a clock request signal. Upon reading the MAXLAT field of each master, the system sets a clock control timer 908 in accordance with the MAXLAT value corresponding to the master which requires the most frequent access to the peripheral bus 102 (among those that cannot generate a clock request signal CLKREQ. If the master requiring the peripheral bus 102 most frequently specifies a maximum latency time of, for example, 2 microseconds, the system sets the clock control timer 908 such that it cycles (or triggers) every one microsecond (i.e., one-half of the specified maximum latency time). Thereafter, if a decision is made by the power management unit 111 to stop the peripheral bus clock, the clock control timer 908 begins cycling. Upon lapse of each microsecond, the clock control circuit 906 causes the clock generator 122 to provide at least one clock edge (i.e., a one-shot or a multi-shot). This ensures that any bus master such as master 902 coupled to peripheral bus 102 can generate a synchronous bus request signal (i.e., SREQ2) to obtain mastership of peripheral bus 102 even though that master is incapable of generating a clock request signal CLKREQ. Upon reset of a synchronous bus request signal SREQx, the programmable clock control circuit 906 causes the power management unit 111 to reenter the normal operating mode wherein the peripheral bus clock signal is driven at its maximum (or normal) frequency. The requesting master can thereby be serviced.

It is noted that although in the preferred embodiment the clock control timer 908 is set with a period of half the specified maximum latency time, the clock control timer 908 may be set with other values that are proportional (or dependent upon) the specified maximum latency time. For example, depending upon the system, the clock control timer 908 could be set with a period of ⅓ the maximum latency time. Optimal power optimization is believed to be achieved, however, by setting the period to ½ the maximum latency time, while ensuring that each master can obtain mastership of the peripheral bus without the loss of data.

Figure 10:
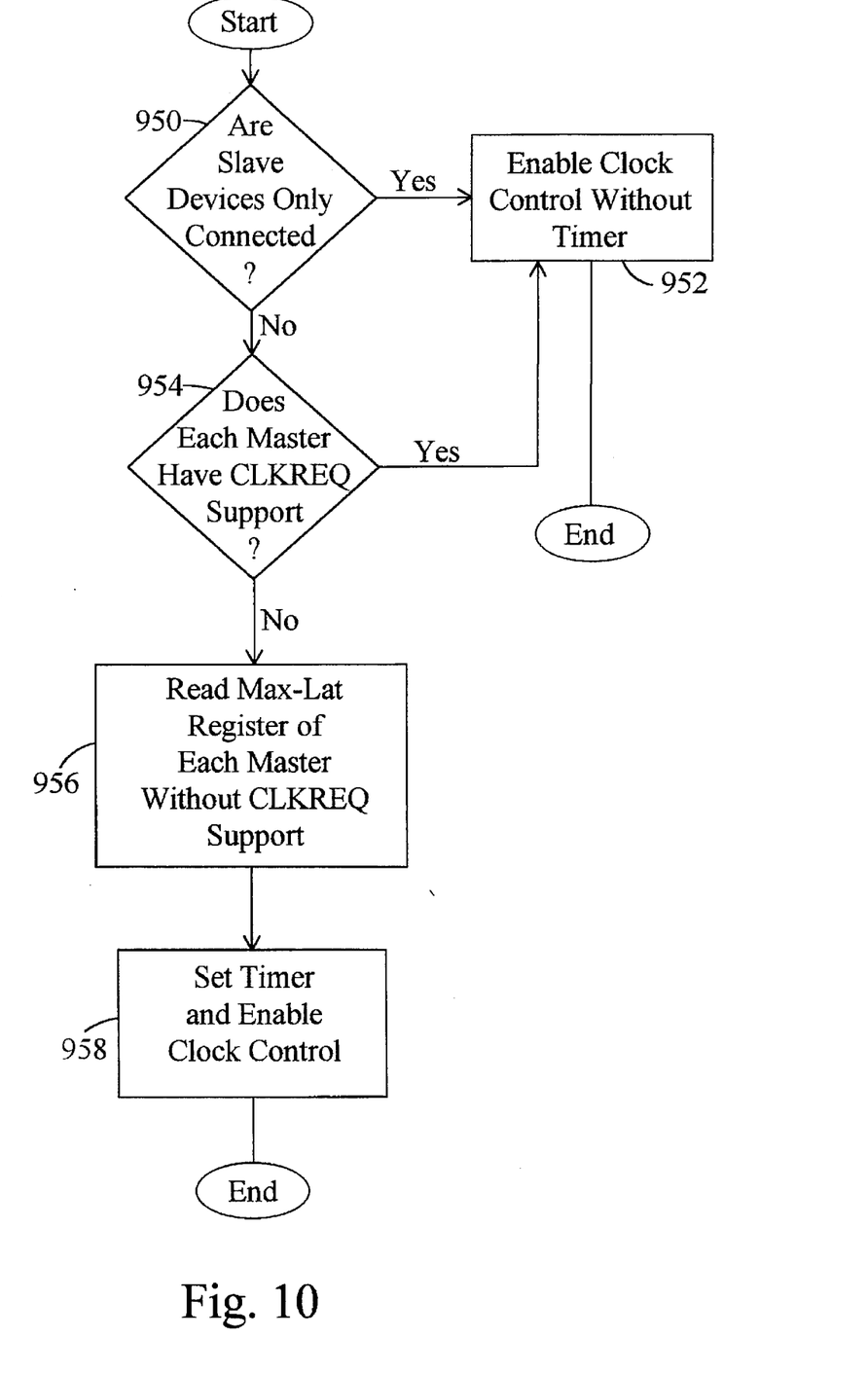
FIG. 10 is a flow diagram that illustrates the operation of a programmable clock control circuit within the computersystem of FIG. 9.

The system of FIG. 9 thereby accomodates optimization of power management by stopping the clock signal for as long as possible between providing each periodic clock edge. FIG. 10 is a flow diagram that illustrates the operation of the system of FIG. 9. During step 950, the system BIOS determines whether only slave devices are couple to peripheral bus 102. If so, the programmable clock control circuit is set during step 952 to operate in accordance with the systems of FIGS. 4 and 6 without accomodating bus masters that cannot generate the clock request signal CLKREQ. A similar operation is set if each master connected to peripheral bus 102 is capable of generating the clock request signal CLKREQ, as determined by step 954. If one or more of the masters connected to peripheral bus 102 cannot support generation of the clock request signal, the MAXLAT field of the masters are read during step 956, and the clock control timer 908 is set during step 958 with a value which is half the period required by the master device requiring access most often.

Figure 11:
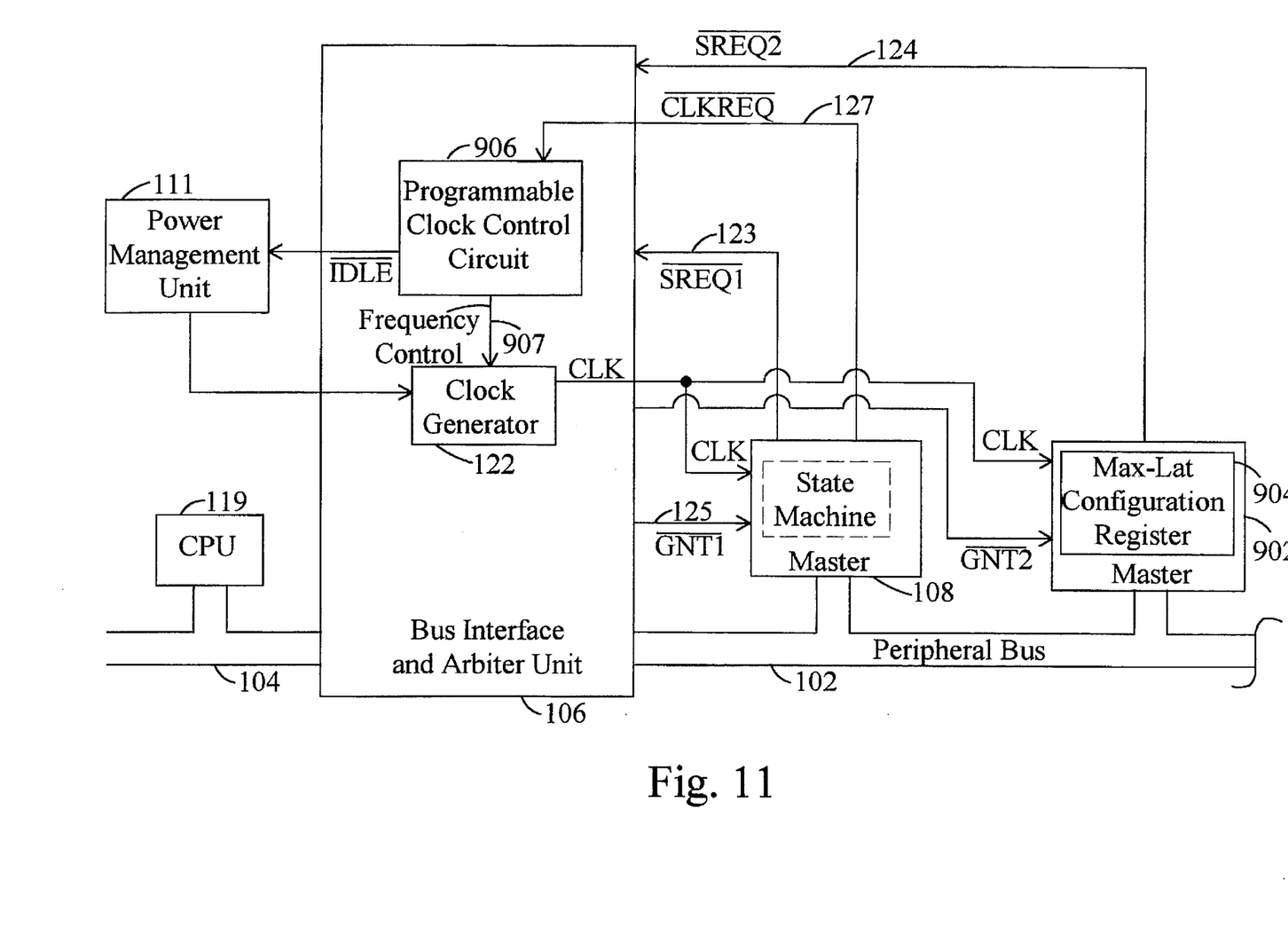
FIG. 11 is a block diagram that illustrates a computer system including a conventional master device.

If the power management unit 111 (via clock generator 122) alternatively causes the peripheral bus clock signal to be slowed during the power conserving mode (rather than completely stopping the clock signal), the values read from the MAXLAT fields of each master may be used to determine the minimum frequency at which the clock signal may be slowed. Such an embodiment is illustrated in FIG. 11. For the embodiment of FIG. 11, the clock generator 122 is set by the programmable clock control circuit 906 to generate a peripheral bus clock signal at a period of not larger than half the maximum latency value specified within the MAXLAT field of the master requiring the peripheral bus most frequently. For example, if the master 902 indicates that it may require access to peripheral bus 102 every 2 microseconds in accordance with the value of register 904, and if it is the master which requires access to peripheral bus 102 the most often (of those masters that cannot support generation of the clock request signal), programmable clock control circuit 906 generates a frequency control signal at line 907 which causes clock generator 122 to drive the peripheral bus clock signal with a period of 1 microsecond (or of at most 1 microsecond) during the power conserving mode. This ensures that master 902 will be capable of generating a synchronous bus request signal at least as often as it may require. It is noted that once the bus request signal SREQx is generated by a particular master, power management unit 111 causes the clock generator 122 to drive the peripheral bus clock signal at full frequency.

As a result of a system according to the present invention, a peripheral bus clock signal can be stopped or slowed for power management while still accommodating alternate bus masters that must assert a synchronous bus request signal to obtain mastership of the peripheral bus.

The algorithmic state machines 300, 500, 700 and 800 described above may be reduced to sequential logic circuits by employing a variety of well known circuit reduction techniques. For example, computer-aided design tools may be employed to reduce the state machines 300, 500, 700 and 800 to sequential logic circuits. Exemplary computer-aided design tools include the VFSIC hardware description language and the VERILOG description language.

The power management unit 111 of FIGS. 2 and 4 may be configured to implement a variety of additional power management functions in addition to that described above. For example, power management unit 111 may be designed to implement functions similar to those described in U.S. Pat. No. 5,167,024 issued Nov. 24, 1992 to Smith et al. This patent is incorporated herein by reference in its entirety.

It is noted that slave device 600 could be embodied by a variety of specific peripheral devices. For example, slave device 600 could be a disk controller device or an audio controller device.

Furthermore, although the clock generator of 122 is shown within a bus interface and arbiter unit 106 in the embodiments described above, the clock generator 122 could be incorporated within a variety of alternative circuit blocks of computer system 100.

This application is related to the commonly assigned, co-pending applications entitled "System and Method for Re-Starting a Peripheral Bus Clock Signal and Requesting Mastership of a Peripheral Bus", Ser. No 08/125,406, filed Sep. 22, 1993 by Gephardt et al.; and "System and Method For Controlling A Peripheral Bus Clock Signal Through A Slave Device", Ser. No. 08/131,092, filed Oct. 1, 1993 by MacDonald. These co-pending applications are incorporated herein by reference in their entirety.

Numerous variations and modifications will become apparent to those skilled in the art once the above disclosure is fully appreciated. For example, it is understood that the peripheral bus clock signal could be reduced to any frequency level during the power conserving modes rather than completely stopping the clock signal (at 0 Hz). It is intended that the following claims be interpreted to embrace all such variations and modifications.

What is claimed is:

1. A computer system comprising:
    a microprocessor;
    a local bus coupled to said microprocessor;
    a peripheral bus;
    a bus interface and arbiter unit coupled to said local bus and to said peripheral bus configured to control the transfer of data and address signals between said local bus and said peripheral bus and configured to arbitrate mastership of said peripheral bus;
    a clock generator circuit coupled to provide a peripheral bus clock signal on said peripheral bus, wherein said peripheral bus clock signal is configured to be selectively controlled;
    an alternate bus master requiring access to said peripheral bus at an access rate, wherein said alternate bus master is coupled to said peripheral bus and wherein said alternate bus master is incapable of asserting a clock request signal when said peripheral bus clock signal is off;
    a clock control circuit coupled to said alternate bus master and said clock generator circuit configured to drive said peripheral bus clock signal at a first predetermined rate, said clock control circuit configured to detect said access rate of said alternate bus master;
    wherein said clock control circuit is configured to provide at least one clock edge at a second predetermined rate when said peripheral bus clock is not at said first predetermined rate, said second predetermined rate being less than said first predetermined rate and based on said access rate.

2. The computer system of claim 1, wherein said alternate bus master is configured to request access to said peripheral bus upon receipt of said at least one clock edge.

3. The computer system of claim 1, wherein said second predetermined rate is twice the maximum latency rate.

4. The computer system of claim 1 wherein said peripheral bus is a PCI bus.

5. A computer system comprising:
    a microprocessor;
    a local bus coupled to said microprocessor;
    a peripheral bus;
    a bus interface and arbiter unit coupled to said local bus and to said peripheral bus configured to control the transfer of data and address signals between said local bus and said peripheral bus and configured to arbitrate mastership of said peripheral bus;
    a clock generator circuit coupled to provide a peripheral bus clock signal on said peripheral bus wherein said peripheral bus clock signal is configured to be selectively controlled;

an alternate bus master coupled to said peripheral bus wherein said alternate bus master is incapable of asserting a clock request signal when said peripheral bus clock signal is in a power reduction mode, said peripheral bus clock signal being driven at a first predetermined rate;

a clock control circuit coupled to said alternate bus master and said clock generator circuit configured to drive said peripheral bus clock signal in a normal mode at a second predetermined rate; and wherein said clock control circuit is configured to provide at least one clock edge at said first predetermined rate during said power reduction mode said first predetermined rate being based on a maximum latency time that said alternate bus master requires access to said peripheral bus.

6. A computer system comprising:

a microprocessor;

a local bus coupled to said microprocessor;

a peripheral bus;

means coupled to said local bus and to said peripheral bus for controlling the transfer of data and address signals between said local bus and said peripheral bus, said controlling means including means for arbitrating mastership of said peripheral bus;

means for selectively generating a peripheral bus clock signal on said peripheral bus, said selectively generating means including means for selecting the clock rate of said peripheral bus clock signal, said clock rate including at least a normal mode and a power reduction mode of operation;

a bus master coupled to said peripheral bus, said bus master requiring a clock signal in order to request access to said peripheral bus; and means for providing a minimal clock rate during said power reduction mode on said peripheral bus such that said bus master can request bus access.

7. The computer system of claim 1 wherein said alternate bus master includes a storage location holding a value indicative of said alternate bus master's access rate and wherein said clock control circuit polls said alternate bus master to detect said access rate.

* * * * *